May 26, 1970 I. CERESNA 3,514,259
CARBON BLACK REACTOR AND PROCESS
Filed Jan. 30, 1968
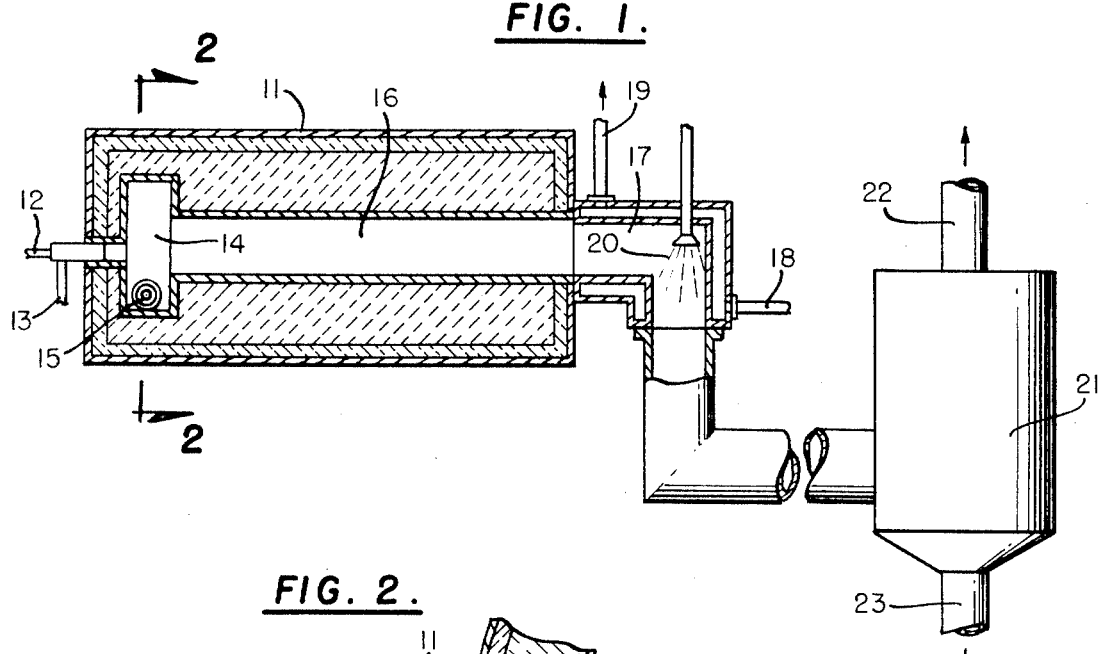
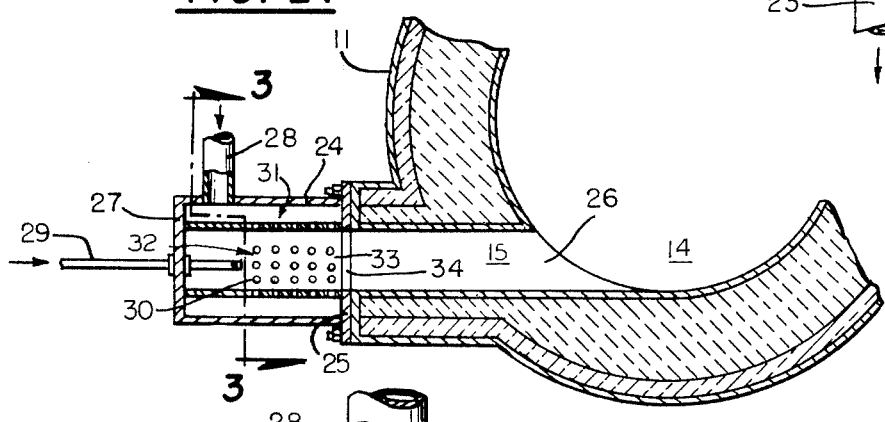
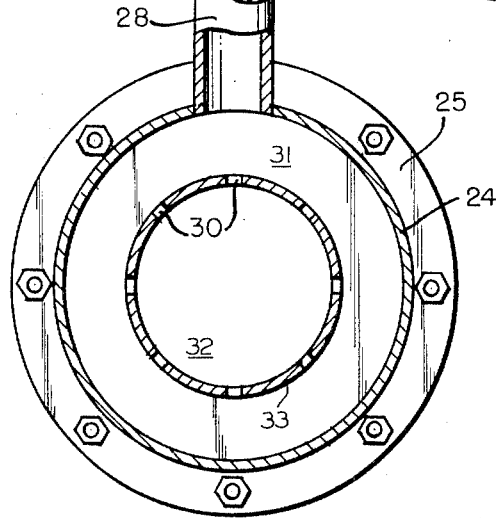
INVENTOR
Ivan Ceresna
BY Walter H. Schneider
ATTORNEY United States Patent Office 3,514,259
Patented May 26, 1970

3,514,259
CARBON BLACK REACTOR AND PROCESS
Ivan Ceresna, Houston, Tex., assignor to Ashland Oil &
Refining Company, Houston, Tex., a corporation of
Kentucky
Filed Jan. 30, 1968, Ser. No. 701,768
Int. Cl. C09c 1/50
U.S. Cl. 23—209.4  7 Claims

ABSTRACT OF THE DISCLOSURE

The application discloses a tangential entry precombustion type carbon black producing furnace fitted with a burner having a burner chamber with perforate side walls, a fuel inlet conduit having an outlet port in the chamber, and means for forcing combustion-supporting gas through the perforate side walls into the chamber. The furnace/burner combination has utility in the production of carbon black of enhanced structure.

BACKGROUND OF THE INVENTION

Field of the invention

This invention relates to methods and apparatus for the production of carbon black. More particularly it relates to improvements in tangential entry precombustion type carbon black processes and apparatus, and especially to improvements in the manner of and apparatus for combustion of the fuel therein, whereby desired changes in the properties of the carbon black product may be obtained.

Description of prior art

In commercial carbon black processes, a hydrocarbon is the raw material, and it is caused to break down, crack, decompose or dissociate into carbon black and by products by the application of heat. The hydrocarbon raw material is commonly referred to as "make" or "feedstock." The necessary heat may be obtained by burning a portion of the feedstock to carbon oxides and water vapor, the remainder dissociating to carbon black and by products. Alternatively, heat may be provided by burning some hydrocarbon other than the feedstock. The separate hydrocarbon, when used, or the burned portion of the feedstock, is usually referred to as fuel to distinguish it from the hydrocarbon or portion thereof from which the carbon black actually forms. It is of course possible to burn both a separate hydrocarbon and part of the feedstock, and this is commonly done in the present day practice of the furnace method. Air is the combustion supporting gas that is most frequently used in the furnace process, but any free-oxygen containing gas such as oxygen enriched air or even pure oxygen may be used, and the term oxygen, as employed in this specification and claims is intended to cover these and any other equivalent alternatives.

The furnace process is characterized by a number of features which clearly set it apart from other methods. One such feature is the fact that the process is conducted in a confined zone or zones of limited cross-section ranging from a few inches to a few feet across. Hot combustion gases from the burning of fuel and/or feedstock are generated on a continuous basis in the confined zone(s) or in external burners in communication with the zone(s). Sufficiently high rates of combustion are maintained to sustain a very hot (e.g. above 2000° F.) flow of turbulent combustion gases moving through said zone(s) at very high, e.g. near sonic, velocities. The process is conducted in highly specialized reactors, of which a wide variety are known to persons skilled in the art. The various reactors differ from one another in such details as the number, shape and dimensions of the confined zone(s), the means for generating and directing the flow of the combustion gases and the means for introducing and directing the feedstock into the hot combustion gases.

One type of reactor that has been extensively employed in the furnace process may be referred to as a tangential entry precombustion type reactor. An example of such a reactor comprises a generally cylindrical precombustion chamber, generally having a greater diameter than length. This chamber is commonly fitted with a feedstock injector at one end, and with one or more burners in one or more tangential flame entry ducts in the curved side wall thereof. A reaction chamber or tunnel of greater length than diameter is connected to and in open communication with the other end of the precombustion zone. The end of the reaction chamber which is not connected to the precombustion chamber is connected to conventional equipment for cooling the effluent from the furnace and for collecting the carbon black. Such a reactor together with some of the auxiliary equipment therefor is shown in FIG. 1. See also U.S. Pat. 2,564,700 to J. C. Krejci for further details of construction and operation.

Prior burners for tangential entry precombustion type reactors have taken various forms. For example, one kind of burner for such reactors is characterized by having an imperforate blast tube which extends into the tangential entry duct and terminates therein well back from the tunnel outlet. The other end of the blast tube is connected with a source of air under pressure. A fuel gas tube of substantially smaller diameter than the blast tube enters the blast tube outside the tangential duct and runs towards the interior of the reactor along the axis of the blast tube, terminating just beyond the end of the blast tube. The end of the fuel gas tube is closed. Adjacent the closed end of the tube are circumferentially spaced peripheral outlets from which some gas is projected into the interior of the blast tube and the remainder of the gas is projected into the tangential duct just outside the mouth of the blast tube.

Another prior art precombustion reactor employs burners which also include blast tubes which extend into the tangential ducts almost to the edge of the precombustion chamber. The mouth of the blast tube is beveled inwardly to provide an outlet of reduced cross section, and a nozzle for injection of fuel oil is located in the blast tube a short distance away from this outlet on the axis of the blast tube. Means are provided for injecting combustion air into the blast tube from behind the oil nozzle with a helical movement.

Another burner which has heretofore been employed in tangential entry precombustion reactors also employs an imperforate blast tube whose mouth is of reduced cross section, is provided with means for introducing air to the blast tube with a helical movement and has a coaxial fuel supply conduit of relatively small cross section (compared to the blast tube). However, in this instance, the fuel supply conduit extends through the mouth of the blast tube and is provided with holes for directing the flow of fuel outward from the axis of the fuel pipe entirely outside the mouth of the blast tube. In another type of burner which resembles the one just described in most respects, the fuel supply tube terminates approximately at the mouth of the blast tube in a pair of nozzles intended to provide impinging oil sprays.

Discussion of structure

Various end users of carbon black, including especially the rubber companies, have found that the presence or absence and quantitative level of certain properties are critical to the acceptability of carbon blacks for their purposes. One carbon black property which has received considerable attention of late is the property of "structure."

Structure is the observed phenomenon of spontaneous association of individual carbon black particles with one another to form clusters and chain-like or rod-like units of varying lengths and geometric configurations. While the theoretical explanation of what causes structure is still in doubt, the existence of such property and the fact that different carbon blacks display this property in differing degree is well recognized. In order to differentiate between carbon blacks which manifest structure to varying extents, the terms "low structure," "normal structure" and "high structure" are sometimes employed as general classifications. A low structure carbon black is one in which there is a minimum of clustering, a substantial proportion of particles being discretely divorced each from all the others. A high structure carbon black is one in which a larger or very large portion of the particles is clustered together, only a small proportion of the particles being discretely divorced from the others. Differences in the structure levels of two different grades of carbon black may be discerned by trained observers with the aid of a microscope. Quantitative and semi-quantitative measurements of the degree of structure in a carbon black may be made by a variety of well-known techniques, such as oil absorption tests, testing the modulus of a vulcanized standard rubber recipe containing the black in question with an identical vulcanized recipe containing a control black, void volume tests, die swell tests and so forth.

The structure of the carbon black produced in tangential entry precombustion type reactors was, until several years ago, normally adequate for most end uses. However, the advent of new kinds of rubber, e.g. stereoregulated polybutadiene, and other factors, have created a demand for carbon blacks of enhanced structure. The production of higher than usual structure levels has posed a challenge with tangential reactors. They are apparently relatively insensitive to the type of structure control described in U.S. Pat. 3,222,131. They do respond, as do other types of reactors, to changes in the feedstock, but changing feedstocks is a cumbersome if not impossible way of exercising production control. Some effect, but rather an inadequate one, is obtained by increasing the air preheat temperature. Oxygen enrichment of the combustion-supporting gas works to an extent, but adds considerable expense. Varying the extent to which the feedstock injector extends into the reactor produces a structure effect, but at the expense of particle size, so this technique is of limited application. It has been reported that artificially increasing the sulfur content of the feedstock will enhance structure in such reactors, but again there is added expense, and the addition of sulfur to the product is not always desireable. Thus, there is a need for improvements in tangential entry precombustion type reactors and processes which will render them capable of producing carbon blacks of enhanced structure in an effective and economical manner. Such is the object of the present invention.

BRIEF SUMMARY OF THE INVENTION

In accordance with the apparatus aspect of this invention, the tangential entry ducts of a tangential entry precombustion type reactor are provided with burners having a certain specified configuration. Quite unexpectedly, the burners alter the mode of operation of the reactors in a manner which is not understood at present, but the result of using such burners is to render the tangential reactor capable of more readily producing carbon blacks of enhanced structure levels.

The aforementioned tangential entry ducts have outlet ends, which are the ones which join with the precombustion chamber. The burners are attached to the ducts at the opposite ends thereof, that is, at their inlet ends. Thus, the burners may be outside the tangential duct inlets and connected to them directly or by a short length of conduit, or the burners may be inserted into the outer ends of the tangential ducts. In the latter case, however, the outlets of the burners should be entirely within the tangential ducts.

The burner employed in the present invention comprises a cylindrical chamber defined by wall means, an outlet from the chamber connected with the tangential tunnel of the reactor, a fuel inlet connected to the interior of the chamber, a multiplicity of uniformly distributed, spaced perforations in the wall means, and means for directing combustion-supporting gas through the perforations into the interior of the chamber for mixing with the fuel for combustion therewith. Similar burners have previously been employed in jet or turbine aircraft engines, but the benefits of using such burners in carbon black reactors have not previously been appreciated; therefore the combination of such a burner with a tangential entry precombustion type reactor has not previously been suggested.

In accordance with the method aspects of the present invention, a stream of fuel is directed through a confined mixing zone adjacent the outer end of the tangential entry duct. The fuel passes through the zone and the duct towards the combustion zone. In the confined mixing zone, a plurality of streams of oxygen are directed into impingement with the fuel stream from a plurality of injection sites which are substantially uniformly distributed over the periphery of the longitudinally of the zone. The direction of movement of the oxygen streams is generally away from the sides of the mixing zone towards the interior. The resultant mixture is then ignited and brought into contact with the feedstock for making and recovering carbon black in the usual way.

The invention may be better understood by reference to a specific embodiment thereof which is illustrated in the accompanying drawings. In the drawings, sectional views are taken in the directions indicated by arrows at the ends of section lines and the same numerals are employed to identify the same parts throuhgout the several views. In the drawing:

FIG. 1 is a vertical, longitudinal section of a tangential entry precombustion reactor of the type to which the present invention is applicable.

FIG. 2 is a transverse section of the reactor of FIG. 1 along section lines 2—2 therein.

FIG. 3 is an enlarged portion of FIG. 2.

DESCRIPTION OF A PREFERRED EMBODIMENT

Referring now to FIG. 1 of the drawing, the carbon black production apparatus shown therein is provided with an insulated and ceramic-lined reactor 11 having a combustion chamber 14. A feedstock injector 12, provided with an air-cooling jacket and air supply pipe 13 enters the upstream end of combustion chamber 14. Through the circular sidewalls of chamber 14 enters a tangential duct 15. Connected to the downstream end of chamber 14 and in open communication therewith is the tunnel 16, which connects at its opposite end with a water-jacketed cooling chamber 17 having coolant inlet 18 and outlet 19, as well as a water quench 20. The cooling chamber is in turn connected to any conventional separating apparatus 21 having outlets 22 and 23 for waste gases and carbon black respectively.

Referring now to FIG. 2, which is a partial section taken along section line 2—2 of FIG. 1, tangential duct 15 passes through the side of furnace 11 and communicates with combustion chamber 14 through outlet end 26 of said duct and terminates at its opposite end in an inlet 34. A burner in accordance with the present invention is provided with a cylindrical casing 24, an end cap 27 and sealing flange 25, forming a gas-tight assembly which is mated in gas-tight relationship to said inlet end. Within the burner casing is a perforated, cylindrical member 33 fixed therein in substantially coaxial relationship with the duct 15 and in open commounication therewith. Tubular member 33 should be about the same cross-sectional dimensions as the duct 15, and where said duct is of circular cross-section, it is preferably of the same diameter and mounted in such a manner that its inner surface constitutes an outward extension of the inner surface of the duct.

The tubular member 33 is preferably foraminous, that is, it is provided with a relatively large number of apertures 30. These are distributed all around the circumference of the tubular member, as shown in FIG. 3, and preferably over a substantial portion of its length, e.g. a longitudinal distance equal to at least about ½ the diameter of the cylindrical member 33. The apertures 30 may themselves be circular or otherwise, and may be arranged along straight lines parallel to the central axis of the tubular member, as is shown in FIG. 2, or may be arranged along helical lines. The apertures or holes in adjoining circles are preferably angularly offset with respect to one another. The exact pattern and spacing of the holes in the perforate wall is susceptible of wide variation, so long as the holes are closely enough spaced to provide sufficient cooling to keep the tubular member from melting and the pattern that is selected will bring about a substantially uniform distribution of sites for injection of air through the wall of the tubular member.

The sealing of the inner end of tubular member 33 in gas-tight relationship against the outer face of flange 25 and against the inner face of end plate 27, e.g. as by welding, divides the interior casing 24 into 2 concentric chambers, 31 and 32, the outer chamber 31 being connected with a source of air under pressure through a supply conduit 28 which passes through the wall of casing 24.

The perforations in tubular member 33 may be confined to one portion thereof, as shown in FIG. 2, leaving a non-perforated portion adjacent the outlet of oxygen conduit 28. Directing the oxygen flow against the non-apertured portion forces some of the air to flow around the sides of tubular member 33 before it reaches the apertures, thus combatting the tendency for the air to flow only through the apertures closest to the oxygen conduit, sometimes referred to as "short-circuiting" of the oxygen flow. If it is desired to have the perforations in tubular member 33 extend over its entire length, which may be desirable in certain instances, a baffle between the oxygen conduit outlet and the perforations nearest thereto can help prevent or at least reduce short circuiting.

Any convenient means for introducing gas into the interior of the perforate tubular member adjacent its central axis may be used. However, it is preferred to employ a conduit 29 which passes through end plate 27 on the axis of tubular member 33, terminating, with one or more discharge ports, within an outer portion of tubular member 33 which is outside the area surrounded by the perforations 30. The conduit 29 is connected to any convenient source of fuel gas or vapor under pressure.

The operation of the invention is demonstrated by the examples which appear below and which are given by way of illustration, not limitation. The reactor employed in the examples is a bench scale version of the known, conventional reactor disclosed in U.S. Pat. 2,564,700 to J. C. Krejci, having a 2″ diameter tunnel and a water quenching nozzle located in the tunnel 45″ downstream of the precombustion chamber. The fuel gas employed in the examples had a B.t.u. content of 1050 per standard cubic foot. The feedstock had the following analysis:

| | |
|---|---|
| API gravity 60° F. | 0.8 |
| Spec. gravity, 60° F. | 1.0695 |
| Pour pt., ° F. | 41 |
| Flash pt., ° F. | 165 |
| Viscosity, SSU: | |
| 180° F., secs | 88.3 |
| 210° F., secs | 59.3 |
| Asphaltenes, percent | 4.56 |
| Conradson carbon residue, percent | 10.67 |
| Ash, percent | 0.08 |
| Avg. mol. wt. | 300 |
| Correlation index (Bureau of Mines) | 119 |
| Sulfur, percent | 0.83 |

Example 1 (run No. 1194)

The above-mentioned reactor is fitted with the standard blast tubes and gas injectors customarily used in such reactors and is operated at an air rate of 4800 s.c.f.h. The aforementioned fuel gas is supplied at ambient temperature, at the rate of 320 s.c.f.h.. The aforementioned feedstock is introduced in a preheated condition through an atomizing type spray nozzle producing a conical type spray having a 30° included angle. A reaction temperature of about 2660° to 2700° F. is maintained in the reactor tunnel upstream of the quench spray. The reaction mass is quenched by the quench spray to a temperature of about 1000° F., following which a carbon black having a particle size in the ISAF range is separated therefrom and tested for 300% modulus-60 minutes cure in a conventional rubber recipe, for die swell, and for oil factor (as measurements of structure) and for iodine absorption (as a check on specific surface). The results, along with the temperatures of the process materials, the photelometer number of the carbon black and the yield thereof are set forth in the table which appears below.

Example 2 (runs 1226, 1227 and 1228)

The reactor used in Example 1 was modified by fitting it with a burner as disclosed in this specification and drawing. The perforate tube surrounding the interior chamber of the burner was provided with 220—3/16″ apertures. The procedure of Example 1 was repeated with this burner in place in three separate runs, and the data in respect thereto appears in the table which appears below.

Example 3 (runs 1232, 1233 and 1234)

The procedure of Example 2 was repeated in three separate runs, except that 60 of the 220 apertures in the burner were blocked off for these runs, and the air was delivered to the reactor in a preheated condition (e.g. at a temperature in excess of 300° F.) and at a substantially higher oil rate than in the preceding examples. The data on these runs appear in the table below.

TABLE

| Run No. | Air temp. of | Gas temp. of | Oil rate g.p.h. | Oil temp. of | Photelometer | Yield, pounds per. gal. | 300% Mod. | 60′ p.s.i. | Die swell | Oil Factor cc./100 gr. | Iodine adsorp. m.²/gram |
|---|---|---|---|---|---|---|---|---|---|---|---|
| 1194 | 133 | 82 | 4.26 | 600 | 94 | 3.89 | 2,040 | | 99.2 | 157 | 131 |
| 1226 | 132 | 86 | 4.42 | 510 | 91 | 3.68 | 2,320 | | 79.9 | 176 | 134 |
| 1227 | 132 | 85 | 4.42 | 510 | 93 | 3.85 | 2,340 | | 81.5 | 177 | 131 |
| 1228 | 132 | 86 | 4.57 | 500 | 92 | 4.00 | 2,030 | | 80.7 | 177 | 124 |
| 1232 | 410 | 74 | 5.60 | 500 | 92 | 4.15 | 2,540 | | 70.5 | 191 | 124 |
| 1233 | 490 | 75 | 5.66 | 530 | 92 | 4.40 | 2,390 | | 80.7 | 184 | 127 |
| 1234 | 480 | 75 | 5.94 | 520 | 85 | 4.71 | 2,480 | | 73.9 | 176 | 132 |

Having described my invention in conjunction with a particular specific embodiment and examples thereof, I wish to have it understood that the embodiments disclosed herein are susceptible to modification in accordance with principles known to persons skilled in the art and that the invention is not therefore to be construed as limited to the disclosed embodiments, except as specifically required by the appended claims.

What is claimed is:

1. In a reactor of the tangential entry precombustion type having a combustion chamber and a reaction chamber communicating with one another and defined by wall means, a feedstock injector, at least one tangential entry duct extending through the wall means into the combustion chamber, and a burner connected with the tangential duct for igniting and burning a combustible mixture of fuel and oxygen, the improvement which comprises perforate wall means in said burner surrounding and enclosing a confined mixing zone which is generally in alignment and communication with the tangential duct; fuel introducing means for introducing fuel into the mixing chamber and for causing it to flow past the perforate wall means toward the combustion chamber; and means for forcefully projecting oxygen through the perforate wall means into admixture with the fuel.

2. A reactor according to claim 1 wherein the perforate wall means is a cylindrical foraminous member having a plurality of apertures therein uniformly distributed peripherally and longitudinally of said foraminous member.

3. A reactor according to claim 2 wherein said cylindrical foraminous member has a circular cross-section.

4. A reactor according to claim 2 wherein said burner means includes an outer chamber surrounding said foraminous member and oxygen conduit means connected with said outer chamber and having an outlet therein for introducing oxygen thereto.

5. A reactor according to claim 4 wherein said foraminous member includes an apertured portion and a non-apertured portion, and the outlet of said oxygen conduit means is located adjacent said non-apertured portion.

6. A method of producing carbon black in a reactor of the tangential entry, precombustion type, including a reaction chamber, a combustion chamber, feedstock injection means and a tangential entry duct having an outer end and an inner end which is in communication with the combustion chamber, said method comprising: directing a stream of fuel through a confined mixing zone adjacent the aforesaid outer end and through the tangential entry duct; in said confined mixing zone, directing a plurality of streams of oxygen into impingement with the fuel stream from a plurality of injection sites substantially uniformly distributed over the periphery of and along the length of the mixing zone, said streams being directed generally from the sides of the zone toward the interior thereof; igniting the mixture resulting from the impingement of the streams; directing the resultant combustion gases into the combustion chamber and from thence into the reaction chamber; contacting the combustion gases with feedstock in the reaction chamber; and recovering the resultant carbon black.

7. A method in accordance with claim 6 wherein the oxygen is introduced to the mixing zone in a preheated condition at a temperature in excess of about 300° F.

References Cited

UNITED STATES PATENTS

| | | | |
|---|---|---|---|
| 2,780,529 | 2/1957 | Wrigley | 23—259.5 |
| 2,781,250 | 2/1957 | Miller | 23—259.5 |
| 2,961,300 | 11/1960 | Dollinger | 23—209.4 |
| 3,009,784 | 11/1961 | Krejci | 23—209.4 |
| 3,322,506 | 5/1967 | Wempe et al. | 23—259.5 |

EDWARD J. MEROS, Primary Examiner

U.S. Cl. X.R.

23—259.5